(12) United States Patent
Chou et al.

(10) Patent No.: US 12,401,777 B2
(45) Date of Patent: Aug. 26, 2025

(54) PIXEL ARRANGEMENTS FOR DISPLAYS WITH LENTICULAR LENSES

(71) Applicant: Apple Inc., Cupertino, CA (US)

(72) Inventors: Ping-Yen Chou, Santa Clara, CA (US); Byoungsuk Kim, Palo Alto, CA (US); Cheng-Ho Yu, Milpitas, CA (US); Fu-Chung Huang, Cupertino, CA (US); Hao Chen, Santa Clara, CA (US); Juan He, San Jose, CA (US); Jun Qi, San Jose, CA (US); Manjap Singh, Mountain House, CA (US); Xiaofeng Wang, San Jose, CA (US); Yang Li, San Jose, CA (US); Yi Huang, San Jose, CA (US); Yi-Pai Huang, Zhubei (TW)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 18/432,303

(22) Filed: Feb. 5, 2024

(65) Prior Publication Data
US 2024/0348767 A1    Oct. 17, 2024

Related U.S. Application Data

(60) Provisional application No. 63/495,691, filed on Apr. 12, 2023.

(51) Int. Cl.
*H04N 13/305* (2018.01)
*H04N 13/324* (2018.01)
*H04N 13/351* (2018.01)

(52) U.S. Cl.
CPC ......... *H04N 13/305* (2018.05); *H04N 13/324* (2018.05); *H04N 13/351* (2018.05)

(58) Field of Classification Search
CPC ... H04N 13/305; H04N 13/324; H04N 13/351
(Continued)

(56) References Cited

U.S. PATENT DOCUMENTS

| 5,778,106 A | * | 7/1998 | Juenger | ............ | H04N 23/843 |
| | | | | | 382/167 |
| 7,070,278 B2 | | 7/2006 | Pezzaniti | | |

(Continued)

FOREIGN PATENT DOCUMENTS

| CN | 1985524 A | 6/2007 |
| CN | 103609108 A | 2/2014 |

(Continued)

*Primary Examiner* — Tung T Vo
(74) *Attorney, Agent, or Firm* — Treyz Law Group, P.C.; Joseph F. Guihan; Jinie M. Guihan (57) ABSTRACT

A display may include an array of pixels covered by lenticular lenses. The lenticular lenses may cause expansion of light primarily in a horizontal direction. To improve the perceived resolution of the display, the horizontal resolution of the pixels on the display may be increased. In one possible layout, each pixel includes one red sub-pixel, one blue sub-pixel, and one green sub-pixel. The sub-pixels may be non-square rectangular. The sub-pixels may be the same size or may have the same widths and different heights. Each pixel may be asymmetric about a horizontal axis. In a given row, the pixels may alternate between first and second layouts. The second layout may be a vertically flipped version of the first layout.

20 Claims, 11 Drawing Sheets

(58) Field of Classification Search
USPC .......................................................... 348/51
See application file for complete search history.

(56) References Cited

U.S. PATENT DOCUMENTS

| | | | |
|---|---|---|---|
| 7,736,005 B2 | 6/2010 | Saishu et al. | |
| 8,305,743 B2 | 11/2012 | Wu et al. | |
| 11,143,806 B1* | 10/2021 | Carbone | G02B 27/0018 |
| 2006/0176245 A1 | 8/2006 | Sakai et al. | |
| 2008/0001525 A1* | 1/2008 | Chao | H10K 59/353 |
| | | | 313/503 |
| 2008/0316379 A1* | 12/2008 | Zuidema | H04N 13/317 |
| | | | 348/E13.043 |
| 2009/0052026 A1 | 2/2009 | Takagi et al. | |
| 2009/0141122 A1* | 6/2009 | Hong | G02B 30/30 |
| | | | 348/E13.001 |
| 2009/0244682 A1* | 10/2009 | Saishu | H04N 13/305 |
| | | | 359/463 |
| 2010/0091206 A1* | 4/2010 | Chapman | H04N 13/317 |
| | | | 349/15 |
| 2010/0157577 A1 | 6/2010 | Montgomery et al. | |
| 2012/0127376 A1 | 5/2012 | Shikina | |
| 2012/0139911 A1 | 6/2012 | Saishu et al. | |
| 2012/0229457 A1* | 9/2012 | Hamagishi | H04N 13/324 |
| | | | 345/419 |
| 2012/0320037 A1* | 12/2012 | Aso | H04N 13/356 |
| | | | 345/419 |
| 2013/0155052 A1 | 6/2013 | Ko | |
| 2014/0043323 A1 | 2/2014 | Sumi | |
| 2014/0063213 A1* | 3/2014 | Tsuchihashi | H04N 13/376 |
| | | | 348/59 |
| 2014/0198479 A1* | 7/2014 | Chao | H10K 59/353 |
| | | | 362/84 |
| 2014/0300714 A1* | 10/2014 | Muller | H04N 13/31 |
| | | | 348/54 |
| 2015/0009560 A1 | 1/2015 | Kang et al. | |
| 2015/0138457 A1 | 5/2015 | Kroon | |
| 2015/0189258 A1* | 7/2015 | Jin | H04N 13/305 |
| | | | 348/51 |
| 2015/0222874 A1* | 8/2015 | Thiebaud | H04N 21/632 |
| | | | 348/51 |
| 2015/0277131 A1 | 10/2015 | Park et al. | |
| 2015/0286457 A1 | 10/2015 | Kim et al. | |
| 2016/0021367 A1 | 1/2016 | Yoon et al. | |
| 2016/0077348 A1 | 3/2016 | Kang | |
| 2016/0349523 A1 | 12/2016 | Wei | |
| 2016/0357070 A1 | 12/2016 | Yang et al. | |
| 2016/0360191 A1* | 12/2016 | Yang | H04N 13/31 |
| 2017/0025053 A1* | 1/2017 | Broughton | G09G 3/3607 |
| 2017/0097535 A1 | 4/2017 | Andou et al. | |
| 2017/0223344 A1 | 8/2017 | Kaehler | |
| 2017/0307950 A1 | 10/2017 | Bennett | |
| 2018/0182828 A1 | 6/2018 | Kim | |
| 2018/0292656 A1* | 10/2018 | Geng | H04N 13/344 |
| 2018/0373101 A1 | 12/2018 | Chen | |
| 2020/0043989 A1* | 2/2020 | Liu | H10K 59/353 |
| 2021/0136353 A1 | 5/2021 | Kim et al. | |
| 2022/0223824 A1 | 7/2022 | You et al. | |
| 2022/0350207 A1 | 11/2022 | Zhou et al. | |
| 2023/0345788 A1* | 10/2023 | Xu | C23C 14/042 |
| 2023/0363208 A1* | 11/2023 | Fan | H10K 59/873 |

FOREIGN PATENT DOCUMENTS

| | | |
|---|---|---|
| CN | 104749786 A | 7/2015 |
| CN | 104965308 A | 10/2015 |
| CN | 105372823 A | 3/2016 |
| JP | H07028178 A | 1/1995 |
| JP | H07250352 A | 9/1995 |
| JP | 2000102038 A | 4/2000 |
| JP | 2000267582 A | 9/2000 |
| JP | 2000305041 A | 11/2000 |
| JP | 2005031367 A | 2/2005 |
| JP | 2007171539 A | 7/2007 |
| JP | 2007519033 A | 7/2007 |
| JP | 2007271751 A | 10/2007 |
| JP | 2012198432 A | 10/2012 |
| JP | 2013068683 A | 4/2013 |
| JP | 2014063159 A | 4/2014 |
| JP | 2017529724 A | 10/2017 |
| KR | 20090060061 A | 6/2009 |
| KR | 20130070766 A | 6/2013 |
| KR | 20160010169 A | 1/2016 |
| KR | 20160091498 A | 8/2016 |
| KR | 20170140393 A | 12/2017 |
| TW | 201803106 A | 1/2018 |
| WO | 2012068543 A1 | 5/2012 |
| WO | 2016057588 A2 | 4/2016 |
| WO | 2017126540 A1 | 7/2017 |

\* cited by examiner

PIXEL ARRANGEMENTS FOR DISPLAYS WITH LENTICULAR LENSES

This application claims the benefit of U.S. provisional patent application No. 63/495,691, filed Apr. 12, 2023, which is hereby incorporated by reference herein in its entirety.

FIELD

This relates generally to electronic devices, and, more particularly, to electronic devices with displays.

BACKGROUND

Electronic devices often include displays. In some cases, displays may include lenticular lenses that enable the display to provide three-dimensional content to the viewer. The lenticular lenses may be formed over an array of pixels such as organic light-emitting diode pixels or liquid crystal display pixels.

If care is not taken, lenticular displays may have a lower resolution than desired.

SUMMARY

A display may include a substrate, an array of pixels formed on the substrate and arranged in a plurality of rows that extend in a first direction, and a lenticular lens film formed over the array of pixels. Each pixel in the array of pixels may include three sub-pixels of different colors, each of the three sub-pixels may have a dimension along the first direction, the dimensions of each of the three-sub-pixels may have a same magnitude, the pixels in each row may alternate between a first layout and a second layout, and the second layout may be a flipped version of the first layout.

A display may include a substrate, an array of pixels formed on the substrate and arranged in a plurality of rows that extend in a first direction, and a lenticular lens film formed over the array of pixels. Each pixel in the array of pixels may include three rectangular sub-pixels of different colors, each pixel may be asymmetric in a second direction that is orthogonal to the first direction, each of the three rectangular sub-pixels may have an aspect ratio that is greater than 2:1, the pixels in each row may alternate between a first layout and a second layout, and the second layout may be a flipped version of the first layout.

A display may include a substrate, an array of pixels formed on the substrate and arranged in a plurality of rows that extend in a first direction, and a lenticular lens film formed over the array of pixels. Each pixel in the array of pixels may include three rectangular sub-pixels of different colors, each of the three rectangular sub-pixels may have a width along the first direction and a height that is orthogonal to the width, the width of each rectangular sub-pixel may be less than 25 microns, the height of each rectangular sub-pixel may be greater than 60 microns, the pixels in each row may alternate between a first layout and a second layout, and the second layout may be equivalent to the first layout rotated by 180 degrees around an axis that is parallel to the first direction.

DETAILED DESCRIPTION

Figure 1:
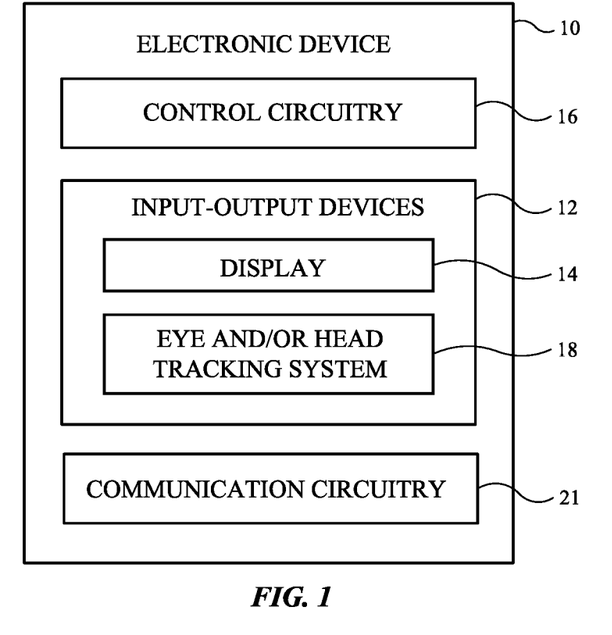
FIG. 1 is a schematic diagram of an illustrative electronic device having a display in accordance with some embodiments.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, an augmented reality (AR) headset and/or virtual reality (VR) headset, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

To support communications between device 10 and external equipment, control circuitry 16 may communicate using communications circuitry 21. Circuitry 21 may include antennas, radio-frequency transceiver circuitry, and other wireless communications circuitry and/or wired communications circuitry. Circuitry 21, which may sometimes be referred to as control circuitry and/or control and communications circuitry, may support bidirectional wireless communications between device 10 and external equipment over a wireless link (e.g., circuitry 21 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a 60 GHz link or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, and other electrical components. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Some electronic devices may include two displays. In one possible arrangement, a first display may be positioned on one side of the device and a second display may be positioned on a second, opposing side of the device. The first and second displays therefore may have a back-to-back arrangement. One or both of the displays may be curved.

Sensors in input-output devices 12 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors in input-output devices 12 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors.

Control circuitry 16 may be used to run software on device 10 such as operating system code and applications. During operation of device 10, the software running on control circuitry 16 may display images on display 14 using an array of pixels in display 14.

Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 14 is an organic light-emitting diode display are sometimes described herein as an example.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Device 10 may include cameras and other components that form part of gaze and/or head tracking system 18. The camera(s) or other components of system 18 may face a user's eyes and may track the user's eyes and/or head (e.g., images and other information captured by system 18 may be analyzed by control circuitry 16 to determine the location of the user's eyes and/or head). This eye-location information obtained by system 18 may be used to determine the appropriate direction with which display content from display 14 should be directed. If desired, image sensors other than cameras (e.g., infrared and/or visible light-emitting diodes and light detectors, etc.) may be used in system 18 to monitor a user's eye and/or head location.

Figure 2:
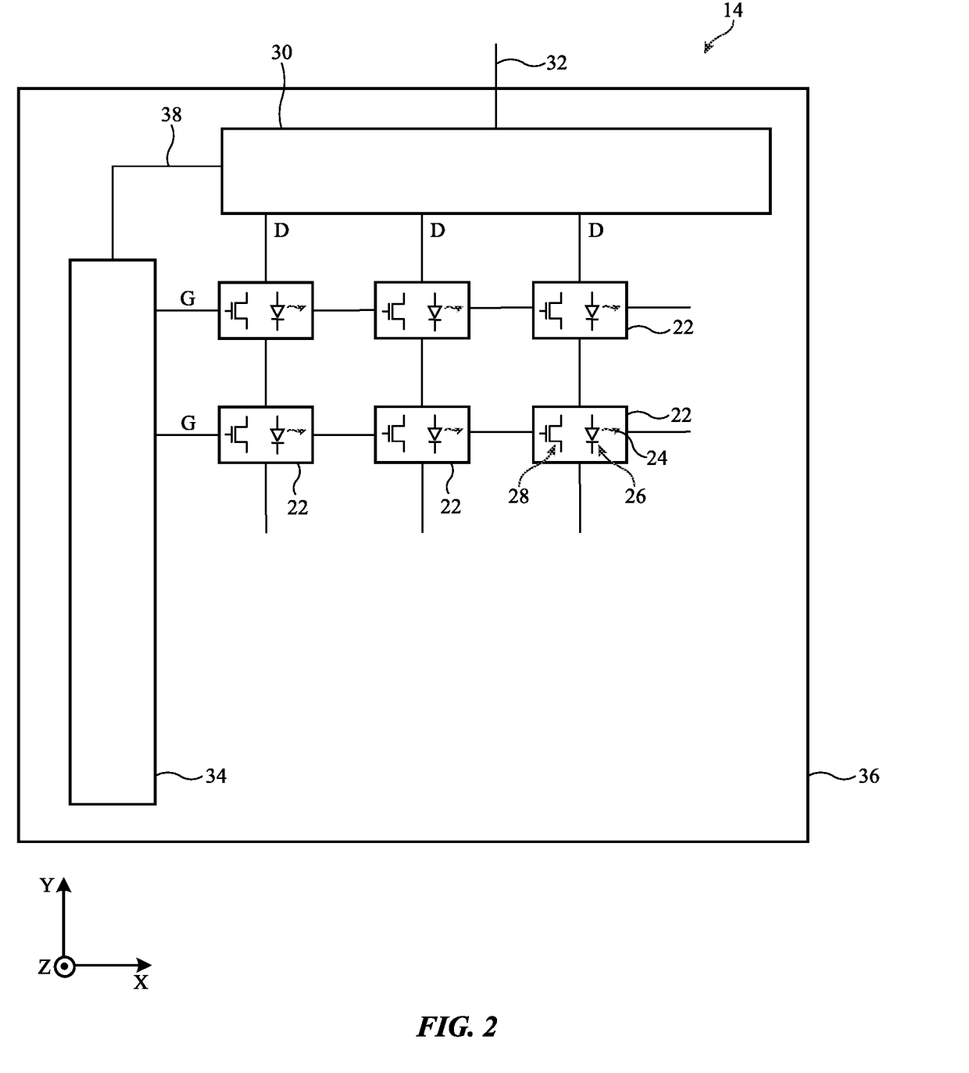
FIG. 2 is a top view of an illustrative display in an electronic device in accordance with some embodiments.

A top view of a portion of display 14 is shown in FIG. 2. As shown in FIG. 2, display 14 may have an array of pixels 22 formed on substrate 36. Substrate 36 may be formed from glass, metal, plastic, ceramic, or other substrate materials. Pixels 22 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 22 in display 14 (e.g., tens or more, hundreds or more, or thousands or more). Each pixel 22 may have a light-emitting diode 26 that emits light 24 under the control of a pixel circuit formed from thin-film transistor circuitry (such as thin-film transistors 28 and thin-film capacitors). Thin-film transistors 28 may be polysilicon thin-film transistors, semiconducting-oxide thin-film transistors such as indium gallium zinc oxide transistors, or thin-film transistors formed from other semiconductors. Pixels 22 may contain light-emitting diodes of different colors (e.g., red, green, and blue diodes for red, green, and blue pixels, respectively) to provide display 14 with the ability to display color images.

Display driver circuitry may be used to control the operation of pixels 22. The display driver circuitry may be formed from integrated circuits, thin-film transistor circuits, or other suitable circuitry. Display driver circuitry 30 of FIG.

2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply circuitry 30 with information on images to be displayed on display 14.

To display the images on display pixels 22, display driver circuitry 30 may supply image data to data lines D while issuing clock signals and other control signals to supporting display driver circuitry such as gate driver circuitry 34 over path 38. If desired, circuitry 30 may also supply clock signals and other control signals to gate driver circuitry on an opposing edge of display 14.

Gate driver circuitry 34 (sometimes referred to as horizontal control line control circuitry) may be implemented as part of an integrated circuit and/or may be implemented using thin-film transistor circuitry. Horizontal control lines G in display 14 may carry gate line signals (scan line signals), emission enable control signals, and other horizontal control signals for controlling the pixels of each row. There may be any suitable number of horizontal control signals per row of pixels 22 (e.g., one or more, two or more, three or more, four or more, etc.).

Display 14 may sometimes be a stereoscopic display that is configured to display three-dimensional content for a viewer. Stereoscopic displays are capable of displaying multiple two-dimensional images that are viewed from slightly different angles. When viewed together, the combination of the two-dimensional images creates the illusion of a three-dimensional image for the viewer. For example, a viewer's left eye may receive a first two-dimensional image and a viewer's right eye may receive a second, different two-dimensional image. The viewer perceives these two different two-dimensional images as a single three-dimensional image.

There are numerous ways to implement a stereoscopic display. Display 14 may be a lenticular display that uses lenticular lenses (e.g., elongated lenses that extend along parallel axes), may be a parallax barrier display that uses parallax barriers (e.g., an opaque layer with precisely spaced slits to create a sense of depth through parallax), may be a volumetric display, or may be any other desired type of stereoscopic display. Configurations in which display 14 is a lenticular display are sometimes described herein as an example.

Figure 3:
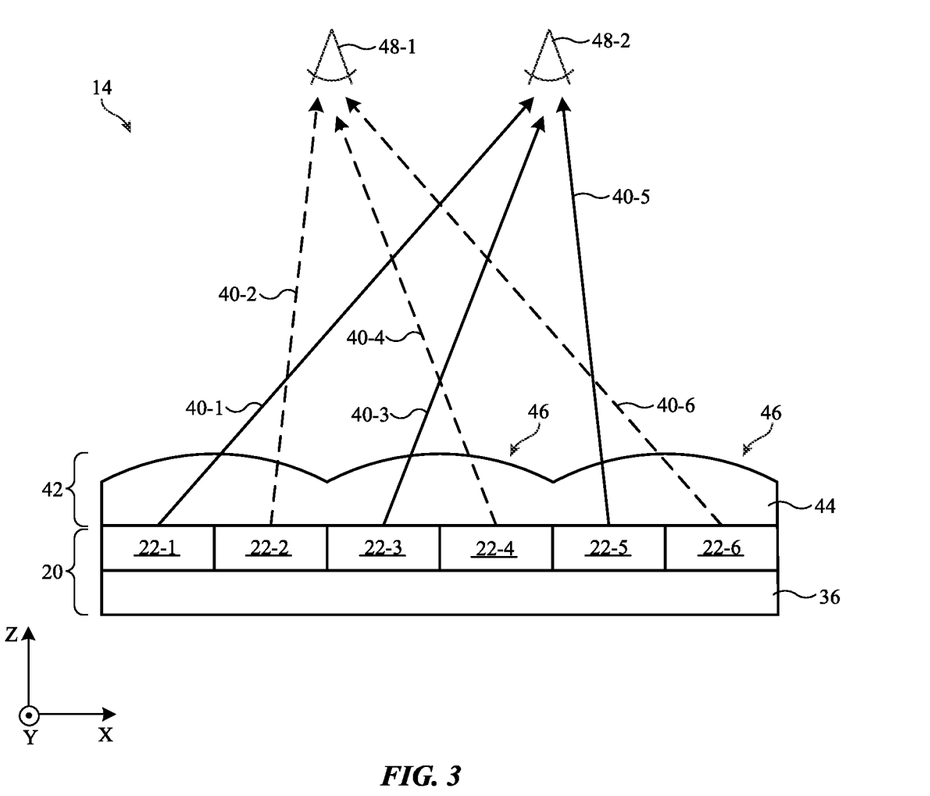
FIG. 3 is a cross-sectional side view of an illustrative lenticular display that provides images to a viewer in accordance with some embodiments.

FIG. 3 is a cross-sectional side view of an illustrative lenticular display that may be incorporated into electronic device 10. Display 14 includes a display panel 20 with pixels 22 on substrate 36. Substrate 36 may be formed from glass, metal, plastic, ceramic, or other substrate materials and pixels 22 may be organic light-emitting diode pixels, liquid crystal display pixels, or any other desired type of pixels.

As shown in FIG. 3, lenticular lens film 42 may be formed over the display pixels. Lenticular lens film 42 (sometimes referred to as a light redirecting film, a lens film, etc.) includes lenses 46 and a base film portion 44 (e.g., a planar film portion to which lenses 46 are attached). Lenses 46 may be lenticular lenses that extend along respective longitudinal axes (e.g., axes that extend into the page parallel to the Y-axis). Lenses 46 may be referred to as lenticular elements 46, lenticular lenses 46, optical elements 46, etc.

The lenses 46 of the lenticular lens film cover the pixels of display 14. An example is shown in FIG. 3 with display pixels 22-1, 22-2, 22-3, 22-4, 22-5, and 22-6. In this example, display pixels 22-1 and 22-2 are covered by a first lenticular lens 46, display pixels 22-3 and 22-4 are covered by a second lenticular lens 46, and display pixels 22-5 and 22-6 are covered by a third lenticular lens 46. The lenticular lenses may redirect light from the display pixels to enable stereoscopic viewing of the display.

Consider the example of display 14 being viewed by a viewer with a first eye (e.g., a right eye) 48-1 and a second eye (e.g., a left eye) 48-2. Light from pixel 22-1 is directed by the lenticular lens film in direction 40-1 towards left eye 48-2, light from pixel 22-2 is directed by the lenticular lens film in direction 40-2 towards right eye 48-1, light from pixel 22-3 is directed by the lenticular lens film in direction 40-3 towards left eye 48-2, light from pixel 22-4 is directed by the lenticular lens film in direction 40-4 towards right eye 48-1, light from pixel 22-5 is directed by the lenticular lens film in direction 40-5 towards left eye 48-2, light from pixel 22-6 is directed by the lenticular lens film in direction 40-6 towards right eye 48-1. In this way, the viewer's right eye 48-1 receives images from pixels 22-2, 22-4, and 22-6, whereas left eye 48-2 receives images from pixels 22-1, 22-3, and 22-5. Pixels 22-2, 22-4, and 22-6 may be used to display a slightly different image than pixels 22-1, 22-3, and 22-5. Consequently, the viewer may perceive the received images as a single three-dimensional image.

Pixels of the same color may be covered by a respective lenticular lens 46. In one example, pixels 22-1 and 22-2 may be red pixels that emit red light, pixels 22-3 and 22-4 may be green pixels that emit green light, and pixels 22-5 and 22-6 may be blue pixels that emit blue light. This example is merely illustrative. In general, each lenticular lens may cover any desired number of pixels each having any desired color. The lenticular lens may cover a plurality of pixels having the same color, may cover a plurality of pixels each having different colors, may cover a plurality of pixels with some pixels being the same color and some pixels being different colors, etc.

Figure 4:
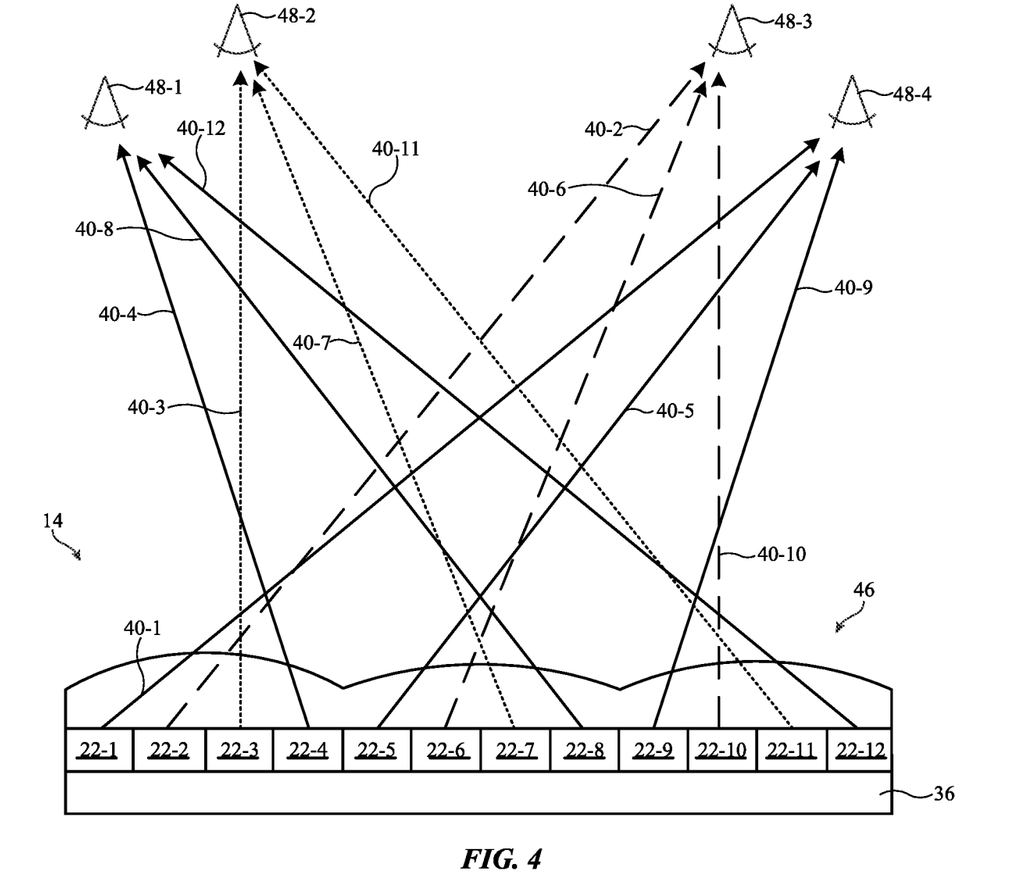
FIG. 4 is a cross-sectional side view of an illustrative lenticular display that provides images to two or more viewers in accordance with some embodiments.

FIG. 4 is a cross-sectional side view of an illustrative stereoscopic display showing how the stereoscopic display may be viewable by multiple viewers. The stereoscopic display of FIG. 3 may have one optimal viewing position (e.g., one viewing position where the images from the display are perceived as three-dimensional). The stereoscopic display of FIG. 4 may have two optimal viewing positions (e.g., two viewing positions where the images from the display are perceived as three-dimensional).

Display 14 may be viewed by both a first viewer with a right eye 48-1 and a left eye 48-2 and a second viewer with a right eye 48-3 and a left eye 48-4. Light from pixel 22-1 is directed by the lenticular lens film in direction 40-1 towards left eye 48-4, light from pixel 22-2 is directed by the lenticular lens film in direction 40-2 towards right eye 48-3, light from pixel 22-3 is directed by the lenticular lens film in direction 40-3 towards left eye 48-2, light from pixel 22-4 is directed by the lenticular lens film in direction 40-4 towards right eye 48-1, light from pixel 22-5 is directed by the lenticular lens film in direction 40-5 towards left eye 48-4, light from pixel 22-6 is directed by the lenticular lens film in direction 40-6 towards right eye 48-3, light from pixel 22-7 is directed by the lenticular lens film in direction 40-7 towards left eye 48-2, light from pixel 22-8 is directed by the lenticular lens film in direction 40-8 towards right eye 48-1, light from pixel 22-9 is directed by the lenticular lens film in direction 40-9 towards left eye 48-4, light from pixel 22-10 is directed by the lenticular lens film in direction 40-10 towards right eye 48-3, light from pixel 22-11 is directed by the lenticular lens film in direction 40-11 towards left eye 48-2, and light from pixel 22-12 is directed by the lenticular lens film in direction 40-12 towards right eye 48-1. In this way, the first viewer's right eye 48-1 receives images from pixels 22-4, 22-8, and 22-12, whereas left eye 48-2 receives images from pixels 22-3, 22-7, and 22-11. Pixels 22-4, 22-8, and 22-12 may be used to display a slightly different image than pixels 22-3, 22-7, and 22-11. Consequently, the first viewer may perceive the received images as a single three-dimensional image. Similarly, the second viewer's right eye 48-3 receives images from pixels 22-2, 22-6, and 22-10, whereas left eye 48-4 receives images from pixels 22-1, 22-5, and 22-9. Pixels 22-2, 22-6, and 22-10 may be used to display a slightly different image than pixels 22-1, 22-5, and 22-9. Consequently, the second viewer may perceive the received images as a single three-dimensional image.

Pixels of the same color may be covered by a respective lenticular lens 46. In one example, pixels 22-1, 22-2, 22-3, and 22-4 may be red pixels that emit red light, pixels 22-5, 22-6, 22-7, and 22-8 may be green pixels that emit green light, and pixels 22-9, 22-10, 22-11, and 22-12 may be blue pixels that emit blue light. This example is merely illustrative. The display may be used to present the same three-dimensional image to both viewers or may present different three-dimensional images to different viewers. In some cases, control circuitry in the electronic device 10 may use eye and/or head tracking system 18 to track the position of one or more viewers and display content on the display based on the detected position of the one or more viewers.

It should be understood that the lenticular lens shapes and directional arrows of FIGS. 3 and 4 are merely illustrative. The actual rays of light from each pixel may follow more complicated paths (e.g., with redirection occurring due to refraction, total internal reflection, etc.). Additionally, light from each pixel may be emitted over a range of angles. The lenticular display may also have lenticular lenses of any desired shape or shapes. Each lenticular lens may have a width that covers two pixels, three pixels, four pixels, more than four pixels, more than ten pixels, etc. Each lenticular lens may have a length that extends across the entire display (e.g., parallel to columns of pixels in the display). The lenticular display may include any desired number of lenticular lenses 46 (e.g., more than 10, more than 100, more than 1,000, more than 10,000, etc.).

Figure 5A:
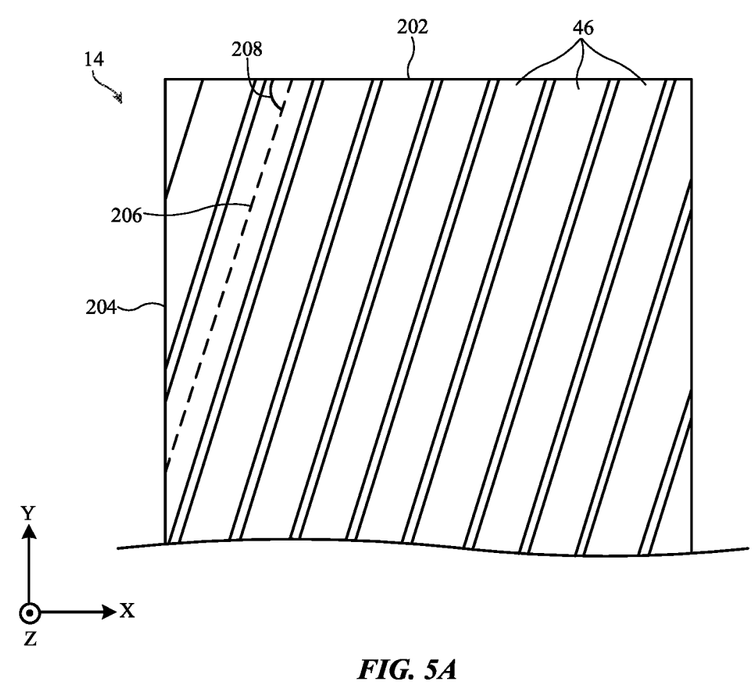
FIGS. 5A and 5B are top views of an illustrative display showing how diagonally oriented lenticular lenses may be formed over a vertical pixel pattern in accordance with some embodiments.
Figure 5B:
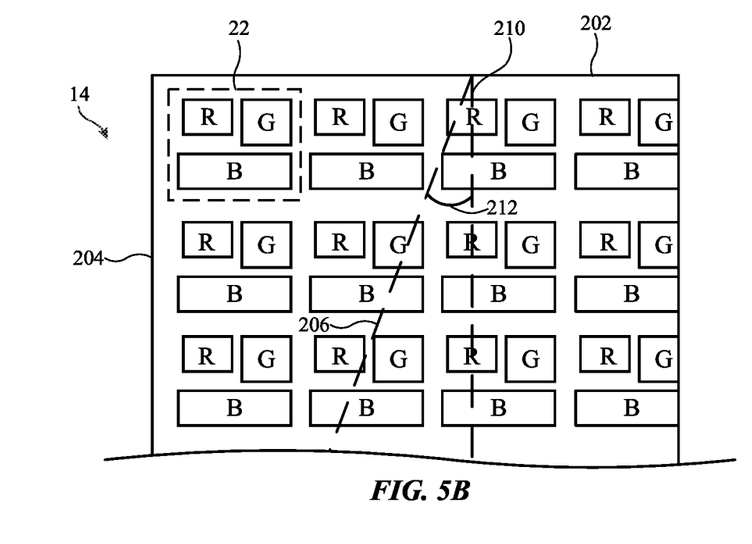

FIGS. 5A and 5B are top views of an illustrative display showing how the lenticular lenses may be at an angle relative to the pixel array. As shown in FIG. 5A, the display may include a lenticular lens film with lenticular lenses 46. The display may have a rectangular periphery with first and second (e.g., upper and lower) opposing edges as well as third and fourth (e.g., left and right) opposing edges. FIG. 5A shows upper edge 202 and side edge 204 (e.g., a left edge). Upper edge 202 and 204 may be orthogonal, as shown in FIG. 5A. The active area of the display and a substrate for the display may have corresponding upper, lower, left, and right edges. The example in FIG. 5A of the upper edge 202 being orthogonal to left edge 204 is merely illustrative. If desired, there may be a rounded corner between the adjacent edges in the display. The display may also include interruptions such as notches or holes in the active area.

Each lenticular lens 46 in the display may extend along a corresponding longitudinal axis 206 (shown in FIG. 5A). In other words, the lenticular lens may have a width, a length, and a height. The length may be greater than the width and height (e.g., by a factor of more than 10, more than 100, more than 1,000, etc.) and the longitudinal axis may extend parallel to the length of the lenticular lens.

As shown in FIG. 5A, the lenticular lenses may be at an angle 208 relative to the upper edge 202 of the display. In this case, angle 208 is less than 90°. The lenticular lenses may be referred to as being angled relative to the display. Angle 208 (e.g., the lower of the two supplementary angles that may be measured between axis 206 and upper edge 202) may be any desired angle (e.g., less than 90°, less than 85°, less than 80°, less than 70°, less than 60°, between 60° and 90°, between 60° and 80°, between 65° and 80°, between 65° and 75°, etc.). The lenticular lenses may also be at an angle relative to the pixel array. Axis 206 is therefore non-parallel and non-orthogonal to upper edge 202 and side edge 204.

FIG. 5B is a top view of an illustrative pixel array that is covered by lenticular lenses 46 from FIG. 5A. As shown in FIG. 5B, each pixel 22 may include a red sub-pixel R, a green sub-pixel G, and a blue sub-pixel B. Each pixel 22 may have the same sub-pixel layout (e.g., the sub-pixels are in the same relative location in each pixel in the array).

In FIG. 5B, the pixels are arranged in a grid such that each row of pixels is placed directly below the preceding row of pixels. Consider the center of each red sub-pixel as an indicator of the pixel layout. The red sub-pixels are arranged in a line 210 that extends vertically across the display. In other words, line 210 is parallel to the left edge 204 of the display and orthogonal to the upper edge 202 of the display. This may be referred to as a vertical pixel pattern (because each pixel is positioned vertically below the pixel in the row above). Said another way, there is no lateral shift between each row and a preceding row.

The longitudinal axis 206 of a lenticular lens is overlaid on FIG. 5B to show the angle between the longitudinal axis 206 and the axis 210 that defines the pixel pattern. As shown in FIG. 5B, angle 212 between the pixel pattern axis and the longitudinal axis is a greater than 0°. In other words, axis 206 is non-orthogonal and non-parallel to axis 210. Angle 212 may have any desired magnitude (e.g., greater than 0°, greater than 5°, greater than 10°, greater than 20°, greater than 30°, between 0° and 30°, between 10° and 30°, between 10° and 25°, between 15° and 25°, etc.).

To summarize, in FIGS. 5A and 5B there is an angle (212) between the longitudinal axes of the lenticular lenses and the underlying pixel pattern. In FIG. 5B, the lenticular lenses are at an angle relative to the upper edge of the display whereas the pixel array follows a vertical pixel pattern that is orthogonal to the upper edge of the display. However, this example is merely illustrative. If desired, the angle between the longitudinal axes of the lenticular lenses and the underlying pixel pattern may be maintained while having the longitudinal axes of the lenticular lenses be orthogonal to the upper edge of the display.

Figure 6A:
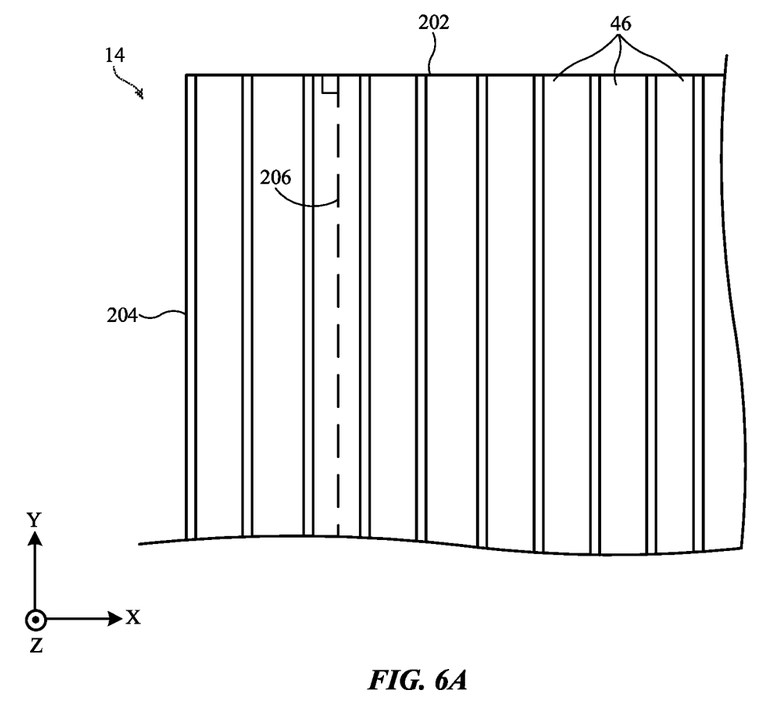
FIGS. 6A and 6B are top views of an illustrative display showing how vertically oriented lenticular lenses may be formed over a diagonal pixel pattern in accordance with some embodiments.
Figure 6B:
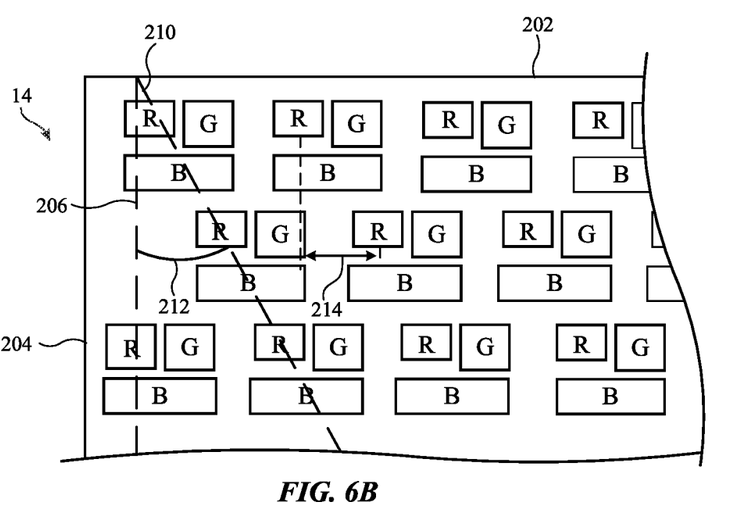

FIGS. 6A and 6B are top views of an illustrative display showing how the pixel rows may be shifted such that there is an angle between the pixel pattern and the lenticular lenses. As shown in FIG. 6A, each lenticular lens 46 may extend along an axis 206 that is orthogonal to the upper edge 202 of the display. Having the lenticular lenses 46 run orthogonal to the upper and lower edges of the display (and parallel to the left and right edges of the display) in this manner may result in the lenticular lenses being less detectable to a viewer during operation of the display.

Although having lenticular lenses 46 run orthogonal to the edges of the display (as in FIG. 6A) may be desirable for certain design criteria, it may still be desirable for the lenticular lenses to extend diagonally across the pixel array. In FIG. 5A, the lenticular lenses extend diagonally relative to the display borders and the pixel array has a vertical layout. In FIGS. 6A and 6B, the lenticular lenses are orthogonal to the display borders and the pixel array may extend diagonally relative to the display borders.

FIG. 6B is a top view of an illustrative pixel array having a row shift to produce the desired angle between the pixel array and lenticular lenses. As shown in FIG. 6B, each row of pixels may be offset from the above row of pixels. Consider the center of each red sub-pixel as an indicator of the pixel layout. The red sub-pixels are arranged in a line 210 that extends diagonally across the display. In other words, line 210 is not parallel to the left edge 204 of the display and is not orthogonal to the upper edge 202 of the display. This may be referred to as a diagonal pixel pattern or diagonal pixel layout (because each pixel is positioned diagonally below the pixel in the row above).

The longitudinal axis 206 of a lenticular lens is overlaid on FIG. 6B to show the angle between the longitudinal axis 206 and the axis 210 that defines the pixel pattern. As shown in FIG. 6B, angle 212 between the pixel pattern axis and the longitudinal axis is greater than 0°. In other words, axis 206 is non-orthogonal and non-parallel to axis 210. Angle 212 may have any desired magnitude (e.g., greater than 0°, greater than 5°, greater than 10°, greater than 20°, greater than 30°, between 0° and 30°, between 10° and 30°, between 10° and 25°, between 15° and 25°, between 5° and 30°, etc.).

The diagonal pattern of FIG. 6B may be the result of a shift of each row relative to the preceding row. For example, in FIG. 6B each red sub-pixel is laterally shifted by distance 214 relative to the red sub-pixel of the preceding row. This row shift results in the diagonal line 210 that defines the pixel array pattern in FIG. 6B. Distance 214 may be greater than 0 and less than the center-to-center pitch of adjacent pixels in a single row.

The illustrative pixel layouts shown in FIGS. 5B and 6B are merely illustrative. Other pixel layouts may be used as desired. For example, some pixel layouts may include diamond shaped sub-pixels (e.g., sub-pixels that are rotated relative to the edges of the display). The shapes and size of each sub-pixel may be selected based on the particular design constraints for a given display.

In FIG. 6A, when the lenticular lenses extend parallel to the Y-axis, the lenticular lenses expand the emitted light in the X-direction but not the Y-direction. In FIG. 5A, the lenticular lenses are angled relative the Y-direction but still expand the emitted light by a greater amount in the X-direction than the Y-direction. In other words, in either FIG. 5A or FIG. 6A the lenticular lenses are dominated by expansion of light in the X-direction (as opposed to expansion of light in the Y-direction). This expansion causes the aspect ratio of a pixel to change between the panel plane (before expansion by the lenticular lenses) and the viewing plane (after expansion by the lenticular lenses and as perceived by the viewer).

Figure 7A:
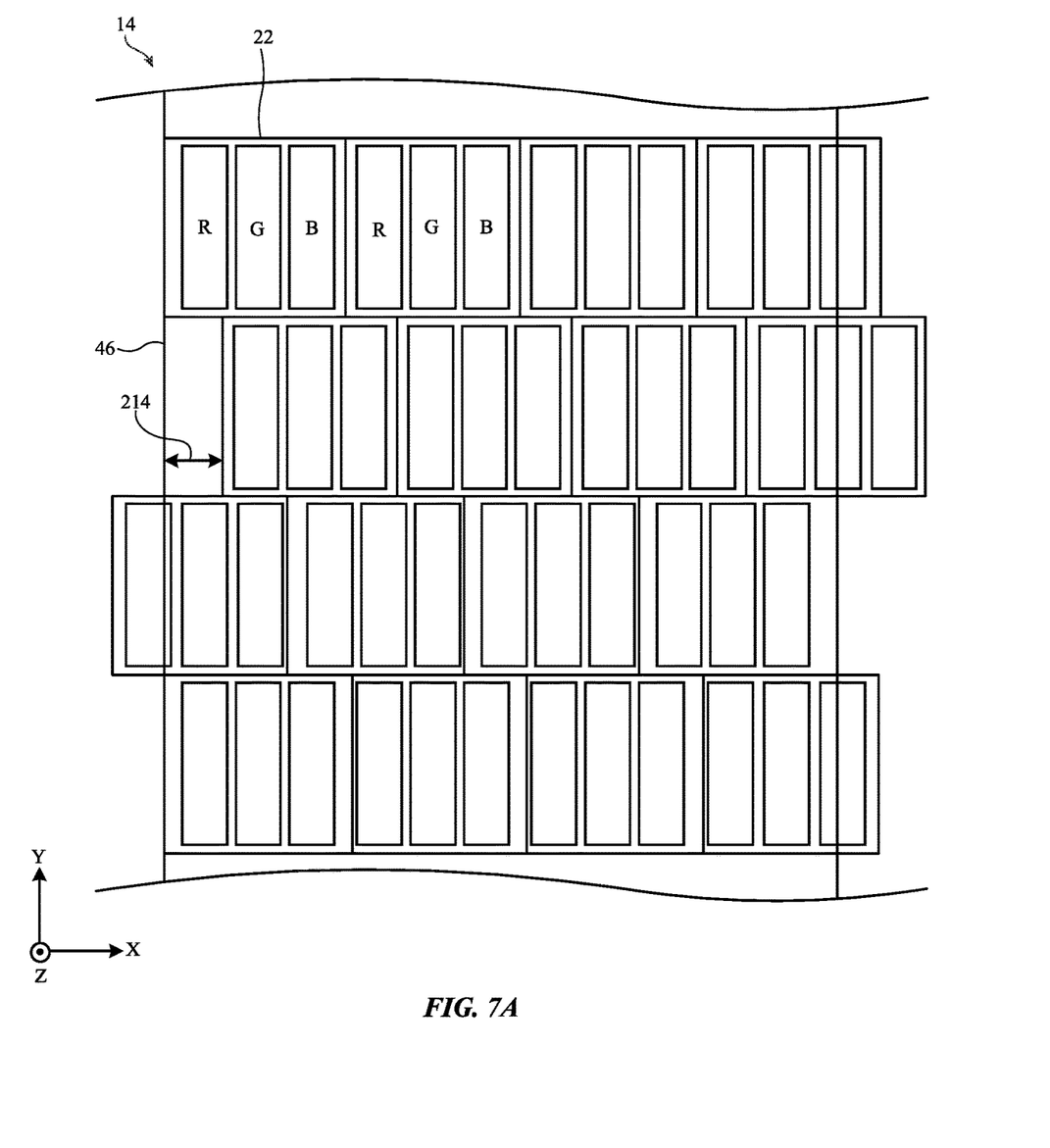
FIG. 7A is a top view of an illustrative display at a display plane in accordance with some embodiments.

Consider the example of FIG. 7A, where a lenticular lens 46 extends orthogonal to the upper edge of the display (as in FIG. 6A). Display pixels 22 have a shift 214 between a given row of pixels and a preceding row of pixels (similar to as shown in FIG. 6B). In FIG. 7A, each pixel 22 includes a red sub-pixel (R), a green sub-pixel (G), and a blue sub-pixel (B). In FIG. 7A, each sub-pixel has the same size and shape. This example is merely illustrative. Each sub-pixel has a width (parallel to the X-direction) and a height (parallel to the Y-direction).

Figure 7B:
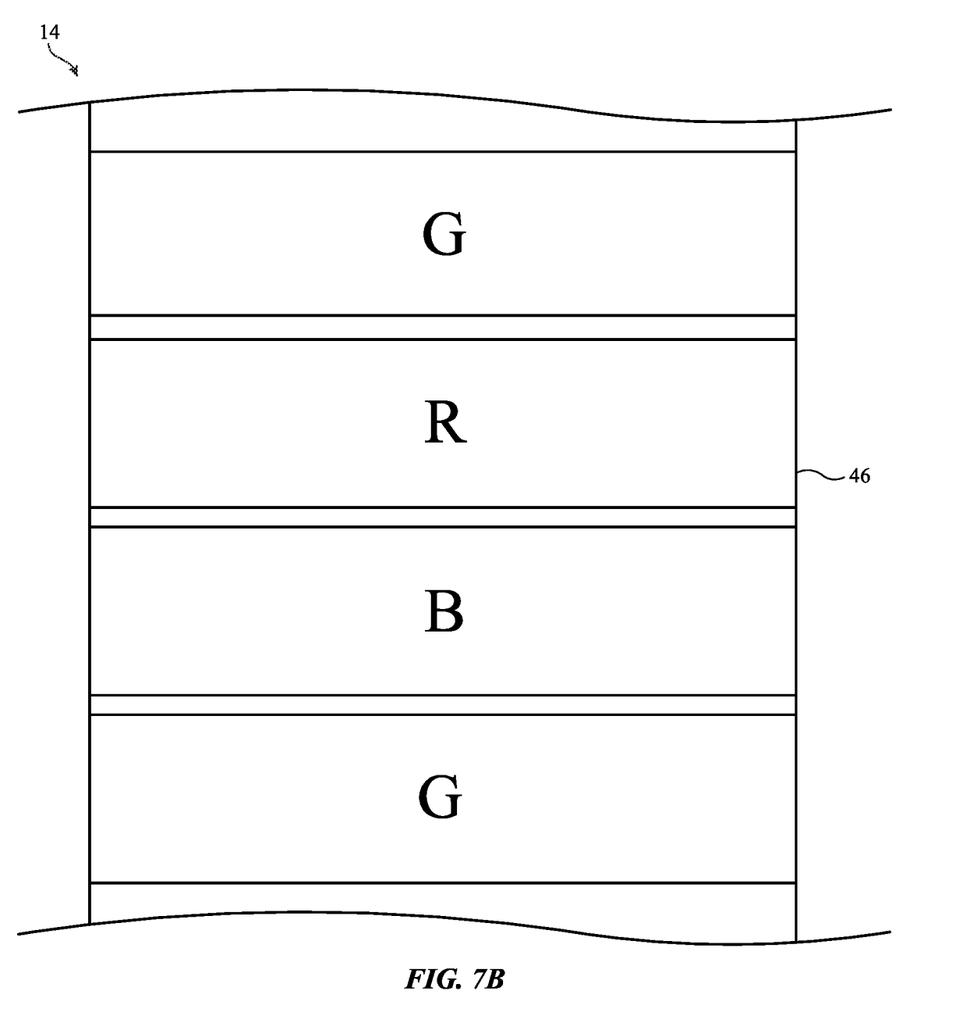
FIG. 7B is a top view of the illustrative display of FIG. 7A at a viewing plane in accordance with some embodiments.

For each lenticular lens, only one sub-pixel in each row is viewable in the viewing plane. FIG. 7B is a view of the viewing plane associated with the display plane of FIG. 7A. As shown in FIG. 7B, one sub-pixel in each row is expanded by the lenticular lens to have a width that matches the width of lenticular lens 46 within the viewing plane. In the display plane (as in FIG. 7A) the width is less than the height but in the viewing plane (as in FIG. 7B) the width is greater than the height. The aspect ratio of the perceived pixels in the viewing plane of FIG. 7B may be higher than desired (with the width much greater than the height).

With the arrangement of FIGS. 7A and 7B, the resolution of the display in the vertical direction (e.g., the Y-direction) in the viewing plane may be satisfactory. However, the resolution of the display in the horizontal direction (e.g., the X-direction) may be lower than desired in the viewing plane. To improve the resolution in the viewing plane, the horizontal resolution of the pixels on the display plane may be increased. However, the vertical resolution of the pixels on the display plane may be kept the same (since the vertical resolution is already satisfactory).

Figure 8A:
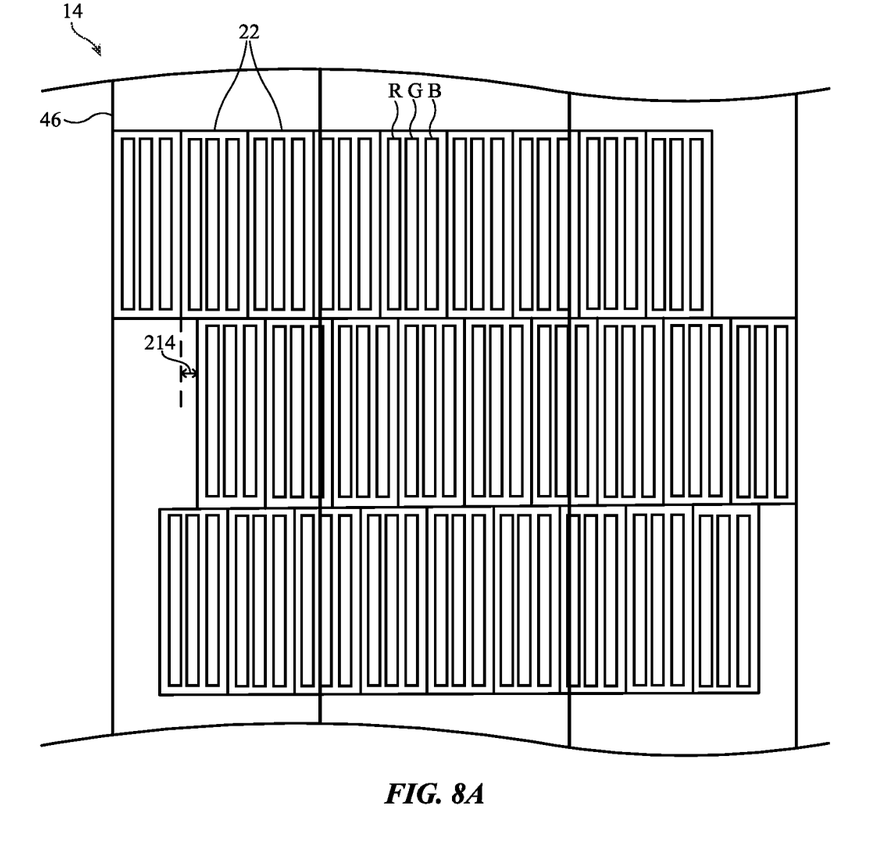
FIG. 8A is a top view of an illustrative display with increased horizontal resolution at a display plane in accordance with some embodiments.

FIG. 8A is a view of the display plane of an illustrative display with increased horizontal resolution. In FIG. 8A, each lenticular lens 46 extends orthogonal to the upper edge of the display (as in FIGS. 6A and 7A). Display pixels 22 have a shift 214 between a given row of pixels and a preceding row of pixels (similar to as shown in FIG. 6B). In FIG. 8A, each pixel 22 includes a red sub-pixel (R), a green sub-pixel (G), and a blue sub-pixel (B). In FIG. 8A, each sub-pixel has the same size and shape. Each sub-pixel has a width (parallel to the X-direction) and a height (parallel to the Y-direction). Each sub-pixel also has an aspect ratio (e.g., the ratio of the greater of the width and height to the remaining one of the width and height). In FIG. 8A, the aspect ratio of each sub-pixel may be greater than 2:1, greater than 2.5:1, greater than 3:1, greater than 4:1, greater than 6:1, greater than 8:1, greater than 10:1, greater than 15:1, etc., with the height being longer than the width.

Figure 8B:
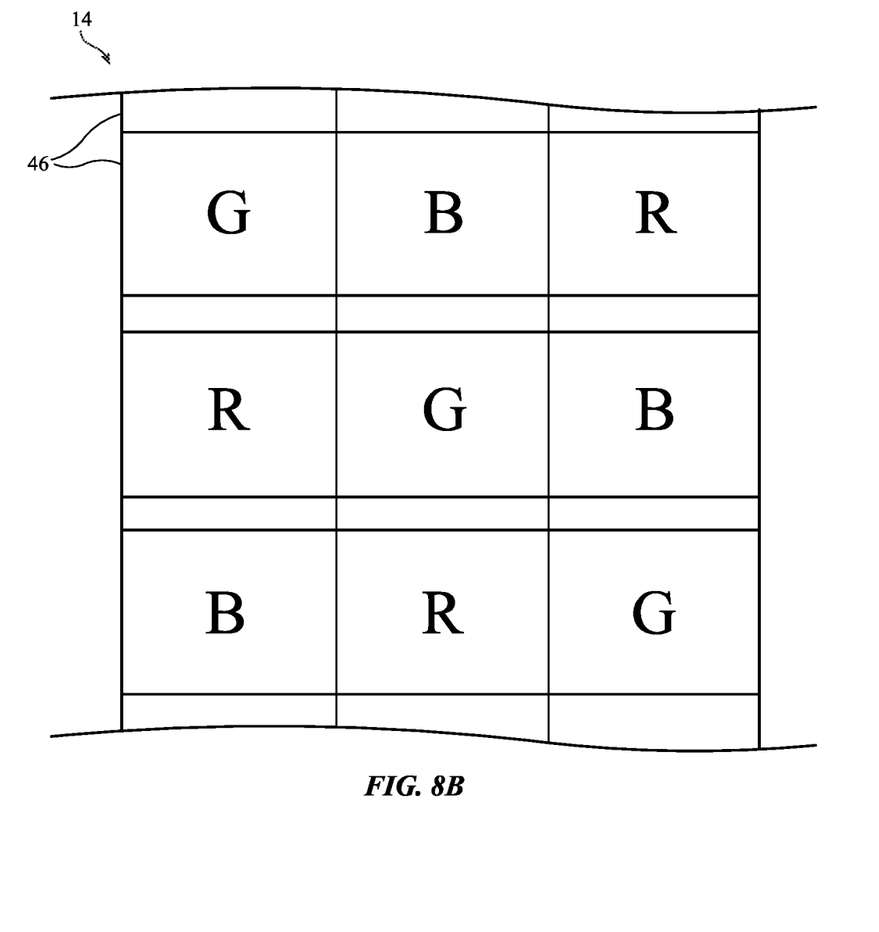
FIG. 8B is a top view of the illustrative display of FIG. 8A at a viewing plane in accordance with some embodiments.

For each lenticular lens, only one sub-pixel in each row is viewable in the viewing plane. FIG. 8B is a view of the viewing plane associated with the display plane of FIG. 8A. As shown in FIG. 8B, one sub-pixel in each row is expanded by each lenticular lens to have a width that matches the width of lenticular lens 46 within the viewing plane. The aspect ratio of each perceived sub-pixel at the viewing plane may be approximately (e.g., within 10%, within 20%, within 50%, etc.) 1:1. The aspect ratio (defined by the ratio of the greater of the width and height to the remaining one of the width and height) of each perceived sub-pixel at the viewing plane may be less than 2:1, less than 1.5:1, less than 1.2:1, etc., with the height being greater than the width or the width being greater than the height.

To summarize, sub-pixels having a high aspect ratio (and high horizontal resolution) may be used in the display plane (as in FIG. 8A) to produce a higher horizontal resolution in the viewing plane (as in FIG. 8B).

Figure 9:
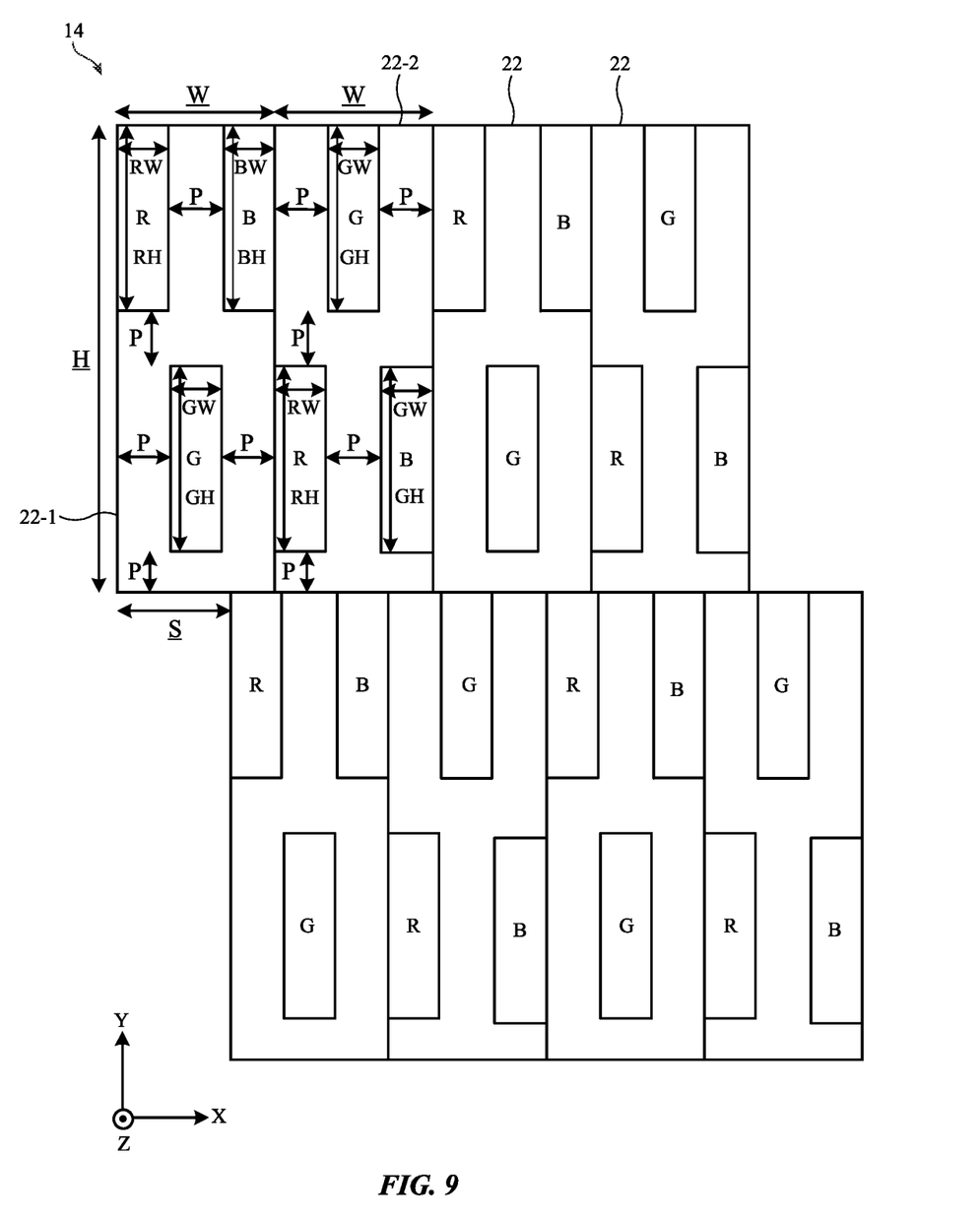
FIG. 9 is a top view of an illustrative display with pixels having alternating first and second layouts in accordance with some embodiments.

FIG. 9 is a top view of an illustrative display. As shown, each pixel may have a layout that is flipped upside down (e.g., in the Y-direction) relative to the adjacent pixels. Alternating the pixel layout in this manner may maximize aperture ratio and light-emissive area of the pixels.

As shown in FIG. 9, each pixel 22 has a width W and a height H. Each pixel includes a green sub-pixel G with a respective height Gh and width Gw, a red sub-pixel R with a respective height Rh and width Rw, and a blue sub-pixel B with a respective height Bh and width Bw. The pixels 22 and sub-pixels in FIG. 9 are non-square rectangular. Each adjacent sub-pixel may be separated in the X-direction by pitch P. Each adjacent sub-pixel may be separated in the Y-direction by pitch P. Pitch P may have the same magnitude for each gap between sub-pixels in both the X-direction and the Y-direction or each pitch magnitude may be equal or greater than a minimum pitch magnitude. The minimum pitch magnitude may be selected based on manufacturing tolerances associated with the formation of the display (e.g., a manufacturing tolerance associated with a fine metal mask used during manufacturing).

As shown in FIG. 9, each pixel includes two sub-pixels in a first row and a third sub-pixel in a second row. For the two sub-pixels in the first row, the sub-pixels may be positioned adjacent to the edge of the display. For example, the red sub-pixel in pixel 22-1 is positioned in the upper-left corner of the pixel and the blue sub-pixel in pixel 22-1 is positioned in the upper-right corner of the pixel. For the green sub-pixel in the second row, the sub-pixel may be centered with a pitch P between the sub-pixel and the edge of the pixel on both sides (see green sub-pixel G in pixel 22-1). The green sub-pixel may be referred to as being positioned in a lower-middle of pixel 22-1.

The layout of each pixel may be flipped (e.g., rotated by 180 degrees around an axis of symmetry that is parallel to the X-axis) relative to its horizontally adjacent pixels. For example, pixel 22-2 is flipped relative to horizontally adjacent pixel 22-1. In pixel 22-1, two sub-pixels (red and blue) are formed in an upper row and a single sub-pixel (green) is formed in a lower row. In pixel 22-2, two sub-pixels (red and blue) are formed in a lower row and a single sub-pixel (green) is formed in an upper row. This pattern results in rows of alternating red, blue, and green sub-pixels.

In a given row, pixels with the layout of pixel 22-1 alternate with pixels with the layout of pixel 22-2. In both the layouts of pixels 22-1 and 22-2, the pixels are asymmetric relative to the X-axis (e.g., asymmetric relative to a horizontal line through a center of the pixel).

The layout of FIG. 9 may be used in a display with lenticular lenses that extend orthogonal to an upper edge of the display (as in FIGS. 6B, 7A, 7B, 8A, and 8B). Accordingly, there may be a lateral shift S in the X-direction between pixels in a given row and pixels in the preceding row. In this case, the magnitude of lateral shift S may be greater than 0 and less than the center-to-center pitch of adjacent pixels in a single row. It is noted that if the lenticular lenses are angled relative to the upper edge of the display (as in FIG. 5A), the magnitude of lateral shift S in FIG. 9 may be equal to 0.

The magnitude of width W in FIG. 9 may be 60 microns, greater than 20 microns, greater than 40 microns, greater than 60 microns, greater than 100 microns, less than 20 microns, less than 40 microns, less than 60 microns, less than 100 microns, between 50 microns and 70 microns, between 30 microns and 90 microns, etc. The magnitude of height H in FIG. 9 may be 180 microns, greater than 100 microns, greater than 150 microns, greater than 200 microns, greater than 300 microns, less than 100 microns, less than 150 microns, less than 200 microns, less than 300 microns, between 160 microns and 200 microns, between 100 microns and 300 microns, etc.

The sub-pixels of different colors in FIG. 9 may have the same size or may have different sizes. When the sub-pixels of different colors have different sizes, the sub-pixels may have the same width but different heights if desired. Having the red, blue, and green sub-pixels all being the same size and shape may improve color balance in the display. When the red, blue, and green sub-pixels are all the same size and shape, Rw, Gw, and Bw have equal magnitudes (Rw=Gw=Bw) and Rh, Gh, and Bh have equal magnitudes (Rh=Gh=Bh). The magnitude of each sub-pixel width (Rw, Gw, and Bw) may be equal to 20 microns, greater than 5 microns, greater than 10 microns, greater than 20 microns, greater than 40 microns, less than 5 microns, less than 10 microns, less than 20 microns, less than 40 microns, between 15 microns and 25 microns, between 10 microns and 30 microns, etc. The magnitude of each sub-pixel height (Rh, Gh, and Bh) may be equal to 60 microns, 65 microns, 70 microns, greater than 20 microns, greater than 40 microns, greater than 60 microns, greater than 100 microns, less than 20 microns, less than 40 microns, less than 60 microns, less than 100 microns, between 60 microns and 70 microns, between 40 microns and 80 microns, between 30 microns and 90 microns, etc.

The example of the red, blue, and green sub-pixels in each pixel having the same size and shape is merely illustrative. Alternatively, two or more of the red, blue, and green sub-pixels in each pixel may have different sizes. As one example, the red, blue, and green sub-pixels may have different widths and different heights. As another example, the red, blue, and green sub-pixels may have the same width and different heights.

The aspect ratio of each pixel may be approximately (e.g., within 10% of) 3:1, less than 3:1, greater than 3:1, greater than 2.5:1 greater than 2:1 between 2:1 and 4:1, between 1.5:1 and 5:1, between 2:1 and 5:1, between 3:1 and 5:1, etc., with the height greater than the width.

The aspect ratio of each sub-pixel may be approximately (e.g., within 10% of) 3:1, less than 3:1, greater than 3:1, greater than 2.5:1 greater than 2:1 between 2:1 and 4:1, between 1.5:1 and 5:1, between 2:1 and 5:1, between 3:1 and 5:1, etc., with the height greater than the width.

The foregoing is merely illustrative and various modifications can be made to the described embodiments. The foregoing embodiments may be implemented individually or in any combination.

The invention claimed is:

1. A display comprising:
    a substrate;
    an array of pixels formed on the substrate and arranged in a plurality of rows that extend in a first direction, wherein each pixel in the array of pixels comprises three sub-pixels of different colors, wherein each of the three sub-pixels has a dimension along the first direction, wherein the dimensions of each of the three-sub-pixels have a same magnitude, wherein the pixels in a given row alternate between a first layout and a second layout, and wherein the second layout is a flipped version of the first layout; and
    a lenticular lens film formed over the array of pixels.

2. The display defined in claim 1, wherein the lenticular lens film comprises a plurality of elongated lenticular lenses that extend in a second direction that is orthogonal to the first direction.

3. The display defined in claim 2, wherein a first pixel in a first row is shifted by a distance in the first direction relative to a second pixel in a second, preceding row and wherein the distance is greater than 0 and less than a center-to-center pitch between adjacent pixels in the first direction.

4. The display defined in claim 1, wherein the pixels in each row alternate between the first layout and the second layout.

5. The display defined in claim 1, wherein the lenticular lens film comprises a plurality of elongated lenticular lenses that extend in a second direction that is non-orthogonal and non-parallel to the first direction.

6. The display defined in claim 5, wherein the array of pixels is arranged in a plurality of columns that are orthogonal to the plurality of rows.

7. The display defined in claim 1, wherein the first layout is flipped in a second direction that is orthogonal to the first direction to form the second layout.

8. The display defined in claim 1, wherein the first direction is a horizontal direction and wherein the first layout is vertically flipped to form the second layout.

9. The display defined in claim 1, wherein the three sub-pixels of different colors comprise one red sub-pixel, one green sub-pixel, and one blue sub-pixel.

10. The display defined in claim 1, wherein, in the first layout, a first of the three-subpixels is in an upper-left corner of the pixel, wherein, in the first layout, a second of the three-subpixels is in an upper-right corner of the pixel, wherein, in the second layout, the first of the three-subpixels is in a lower-left corner of the pixel, wherein, in the second layout, the second of the three-subpixels is in a lower-right corner of the pixel.

11. The display defined in claim 10, wherein, in the first layout, a third of the three-subpixels is in a lower-middle portion of the pixel and wherein, in the second layout, the third of the three-subpixels is in an upper-middle portion of the pixel.

12. The display defined in claim 1, wherein each of the three sub-pixels has an additional dimension along a second direction that is orthogonal to the first direction and wherein the additional dimensions of each of the three-sub-pixels have an additional same magnitude.

13. The display defined in claim 1, wherein each of the three sub-pixels has an additional dimension along a second direction that is orthogonal to the first direction and wherein the additional dimensions of each of the three-sub-pixels have different magnitudes.

14. The display defined in claim 1, wherein each pixel in the array of pixels has an aspect ratio that is greater than 2:1 and wherein each sub-pixel in each pixel has an aspect ratio that is greater than 2:1.

15. The display defined in claim 1, wherein each pixel includes two sub-pixels of the three sub-pixels in a first row and one sub-pixel of the three sub-pixels in a second row.

16. The display defined in claim 1, wherein each pixel is asymmetric in a second direction that is orthogonal to the first direction.

17. A display comprising:
a substrate;
an array of pixels formed on the substrate and arranged in a plurality of rows that extend in a first direction, wherein each pixel in the array of pixels comprises three rectangular sub-pixels of different colors, wherein each pixel is asymmetric in a second direction that is orthogonal to the first direction, wherein each of the three rectangular sub-pixels has an aspect ratio that is greater than 2:1, wherein the pixels in each row alternate between a first layout and a second layout, and wherein the second layout is a flipped version of the first layout; and
a lenticular lens film formed over the array of pixels.

18. The display defined in claim 17, wherein the lenticular lens film comprises a plurality of elongated lenticular lenses that extend in the second direction and wherein a first pixel in a first row is shifted by a distance in the first direction relative to a second pixel in a second, preceding row.

19. The display defined in claim 17, wherein the lenticular lens film comprises a plurality of elongated lenticular lenses that extend in a third direction that is non-orthogonal and non-parallel to the first direction and wherein the array of pixels is arranged in a plurality of columns that are orthogonal to the plurality of rows.

20. A display comprising:
a substrate;
an array of pixels formed on the substrate and arranged in a plurality of rows that extend in a first direction, wherein each pixel in the array of pixels comprises three rectangular sub-pixels of different colors, wherein each of the three rectangular sub-pixels has a width along the first direction and a height that is orthogonal to the width, wherein the width of each rectangular sub-pixel is less than 25 microns, wherein the height of each rectangular sub-pixel is greater than 60 microns, wherein the pixels in each row alternate between a first layout and a second layout different than the first layout, and wherein the second layout is equivalent to the first layout rotated by 180 degrees around an axis that is parallel to the first direction; and
a lenticular lens film formed over the array of pixels.

* * * * *